(12) United States Patent
Yamashita et al.

(10) Patent No.: US 12,116,456 B2
(45) Date of Patent: Oct. 15, 2024

(54) FLUOROPOLYETHER GROUP CONTAINING COMPOUND

(71) Applicant: DAIKIN INDUSTRIES, LTD., Osaka (JP)

(72) Inventors: Tsuneo Yamashita, Osaka (JP); Hisashi Mitsuhashi, Osaka (JP); Takeshi Maehira, Osaka (JP); Yoshimi Motonari, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 600 days.

(21) Appl. No.: 17/484,644

(22) Filed: Sep. 24, 2021

(65) Prior Publication Data

US 2022/0017694 A1    Jan. 20, 2022

Related U.S. Application Data

(63) Continuation of application No. PCT/JP2020/013752, filed on Mar. 26, 2020.

(30) Foreign Application Priority Data

Mar. 29, 2019    (JP) ................ 2019-066346

(51) Int. Cl.
| | |
|---|---|
| C08G 65/336 | (2006.01) |
| C08G 65/00 | (2006.01) |
| C08G 65/333 | (2006.01) |
| C09D 5/16 | (2006.01) |
| C09D 171/00 | (2006.01) |
| C09K 3/18 | (2006.01) |
| G02B 1/18 | (2015.01) |

(52) U.S. Cl.
CPC ................. C08G 65/336 (2013.01)

(58) Field of Classification Search
None
See application file for complete search history.

(56) References Cited

U.S. PATENT DOCUMENTS

| | | | |
|---|---|---|---|
| 2008/0159954 A1 | 7/2008 | Platzek et al. | |
| 2019/0002635 A1* | 1/2019 | Mitsuhashi | ............. C03C 17/42 |
| 2019/0390009 A1 | 12/2019 | Mitsuhashi et al. | |
| 2020/0002551 A1* | 1/2020 | Mitsuhashi | .......... C09D 183/12 |
| 2020/0002567 A1 | 1/2020 | Mitsuhashi et al. | |
| 2020/0231747 A1* | 7/2020 | Furukawa | ............ C08G 65/336 |

FOREIGN PATENT DOCUMENTS

| | | | | |
|---|---|---|---|---|
| CN | 109072049 A | 12/2018 | | |
| JP | 2010-506862 A | 3/2010 | | |
| JP | 2017-082194 A | 5/2017 | | |
| WO | WO-2017022437 A1 * | 2/2017 | ............... | B05D 1/60 |
| WO | WO-2018143433 A1 * | 8/2018 | ............ | C07F 7/1804 |
| WO | 2018/169002 A1 | 9/2018 | | |
| WO | WO-2019163282 A1 * | 8/2019 | ............... | B05D 7/24 |

OTHER PUBLICATIONS

International Search Report of PCT/JP2020/013752 dated Jun. 16, 2020 [PCT/ISA/210].
Extended European Search Report dated Nov. 22, 2022, issued in European Application No. 20782826.0.
International Preliminary Report on Patentability dated Sep. 28, 2021 with a Translation of the Written Opinion of the International Searching Authority in Application No. PCT/JP2020/013752.

* cited by examiner

*Primary Examiner* — Randy P Gulakowski
*Assistant Examiner* — Ha S Nguyen
(74) *Attorney, Agent, or Firm* — Sughrue Mion, PLLC

(57) ABSTRACT

A fluoropolyether group-containing compound of the following formula (1) or (2):

$$R^{F1}-X-R^{Si} \qquad (1)$$

$$R^{Si}-X-R^{F2}-X-R^{Si} \qquad (2)$$

wherein $R^{F1}$, $R^{Si}$ and $R^{F2}$ are as defined herein.

7 Claims, No Drawings

FLUOROPOLYETHER GROUP CONTAINING COMPOUND

CROSS REFERENCE TO RELATED APPLICATIONS

This application is a Rule 53 (b) Continuation of PCT Application No. PCT/JP2020/013752 filed on Mar. 26, 2020, claiming priority based on Japanese Patent Application No. 2019-066346 filed on Mar. 29, 2019, the respective disclosures of which are incorporated herein by reference in their entirety.

TECHNICAL FIELD

The present disclosure relates to a fluoropolyether group-containing compound.

BACKGROUND ART

Certain types of fluorine-containing silane compounds are known to be capable of providing excellent water-repellency, oil-repellency, antifouling property, and the like when used in surface treatment of a substrate. A layer obtained from a surface-treating agent containing a fluorine-containing silane compound (hereinafter, also referred to as a "surface-treating layer") is applied as a so-called functional thin film to a large variety of substrates such as glass, plastics, fibers, and building materials.

A known such fluorine-containing compound is a fluoropolyether group-containing silane compound having a fluoropolyether group in the molecular backbone and a hydrolyzable group bonding to a Si atom at the molecular terminal or in the terminal part (Patent Literature 1).

PRIOR ART LITERATURE

Patent Literature

Patent Literature 1: JP 2017-82194 A

Summary

The present disclosure provides [1] to [15] below.

[1] A fluoropolyether group-containing compound of the following formula (1) or (2):

wherein
$R^{F1}$ is $Rf^1-R^F-O_q-$;
$R^{F2}$ is $-Rf^2{}_p-R^F-O_q-$;
$Rf^1$ is a $C_{1-16}$ alkyl group optionally substituted with one or more fluorine atoms;
$Rf^2$ is a $C_{1-6}$ alkylene group optionally substituted with one or more fluorine atoms;
$R^F$ is each independently at each occurrence a group represented by formula:

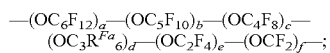

a, b, c, d, e, and f are each independently an integer of 0 to 200, and the sum of a, b, c, d, e, and f is one or more. The occurrence order of the respective repeating units enclosed in parentheses provided with a, b, c, d, e, or f is not limited in the formula;

$R^{Fa}$ is each independently at each occurrence a hydrogen atom, a fluorine atom, or a chlorine atom;
p is 0 or 1;
q is independently 0 or 1;
X is a group represented by the following formula:

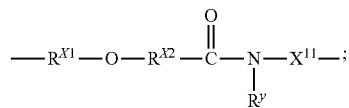

$R^{X1}$ is each independently at each occurrence a $C_{1-6}$ alkylene group;
$R^{X2}$ is each independently at each occurrence a $C_{1-6}$ alkylene group optionally substituted with a $C_{1-6}$ alkyl group or cyclic alkyl group optionally containing one or more nitrogen atoms, oxygen atoms, sulfur atoms, or silicon atoms, or with a perfluoroalkyl group;
$R^y$ is each independently at each occurrence a hydrogen atom, a $C_{1-6}$ alkyl group, or a phenyl group;
$X^{11}$ is each independently at each occurrence a single bond, an oxygen atom, or a divalent organic group;
$R^{Si}$ is each independently at each occurrence represented by the following formula (S1):

$R^{d1}$ is each independently at each occurrence $-Z^2-CR^{31}{}_{p2}R^{32}{}_{q2}R^{33}{}_{r2}$;
$Z^2$ is each independently at each occurrence a single bond, an oxygen atom, or a divalent organic group;
$R^{31}$ is each independently at each occurrence $-Z^{2'}-CR^{32'}{}_{q2'}R^{33'}{}_{r2'}$;
$Z^{2'}$ is each independently at each occurrence a single bond, an oxygen atom, or a divalent organic group;
$R^{32'}$ is each independently at each occurrence $-Z^3-SiR^{34}{}_{n2}R^{35}{}_{3-n2}$;
$R^{33'}$ is each independently at each occurrence a hydrogen atom, a hydroxyl group, or a monovalent organic group;
$q2'$ is each independently at each occurrence an integer of 0 to 3;
$r2'$ is each independently at each occurrence an integer of 0 to 3;
$Z^3$ is each independently at each occurrence a single bond, an oxygen atom, or a divalent organic group;
$R^{34}$ is each independently at each occurrence a hydroxyl group or a hydrolyzable group;
$R^{35}$ is each independently at each occurrence a hydrogen atom or a monovalent organic group;
n2 is each independently at each occurrence an integer of 0 to 3;
$R^{32}$ is each independently at each occurrence $-Z^3-SiR^{34}{}_{n2}R^{35}{}_{3-n2}$;
$R^{33}$ is each independently at each occurrence a hydrogen atom, a hydroxyl group, or a monovalent organic group;
p2 is each independently at each occurrence an integer of 0 to 3;
q2 is each independently at each occurrence an integer of 0 to 3;
r2 is each independently at each occurrence an integer of 0 to 3;
$R^{e1}$ is each independently at each occurrence $-Z^3-SiR^{34}{}_{n2}R^{35}{}_{3-n2}$;

$R^{f1}$ is each independently at each occurrence a hydrogen atom, a hydroxyl group, or a monovalent organic group;

k2 is each independently at each occurrence an integer of 0 to 3;

l2 is each independently at each occurrence an integer of 0 to 3; and m2 is each independently at each occurrence an integer of 0 to 3.

Advantageous Effect

According to the present disclosure, it is possible to provide a fluoropolyether group-containing compound that can be used to form a surface-treating layer having better friction durability.

DESCRIPTION OF EMBODIMENTS

As used herein, the term "monovalent organic group" refers to a monovalent group containing carbon. The monovalent organic group is not limited, and may be a hydrocarbon group or a derivative thereof. The derivative of hydrocarbon group refers to a group that has one or more of N, O, S, Si, amide, sulfonyl, siloxane, carbonyl, carbonyloxy, and the like at the terminal or in the molecular chain of the hydrocarbon group.

As used herein, the "divalent organic group" is not limited, and examples thereof include a divalent group obtained by further removing one hydrogen atom from a hydrocarbon group.

As used herein, the term "hydrocarbon group" refers to a group that contains carbon and hydrogen and that is obtained by removing one hydrogen atom from a molecule. Such a hydrocarbon group is not limited, and examples thereof include a hydrocarbon group, such as an aliphatic hydrocarbon group and an aromatic hydrocarbon group, having 1 to 20 carbon atoms and optionally substituted with one or more substituents. The above "aliphatic hydrocarbon group" may be either straight, branched, or cyclic, and may be either saturated or unsaturated. The hydrocarbon group may contain one or more ring structures. The hydrocarbon group may have one or more of N, O, S, Si, amide, sulfonyl, siloxane, carbonyl, carbonyloxy, and the like at the terminal or in the molecular chain thereof.

As used herein, the substituent of the "hydrocarbon group" is not limited, and examples thereof include one or more groups selected from a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group, each of which is optionally substituted with one or more halogen atoms.

The alkyl group and the phenyl group may be herein unsubstituted or substituted, unless particularly noted. Each substituent of such groups is not limited, and examples thereof include one or more groups selected from a halogen atom, a $C_{1-6}$ alkyl group, a $C_{2-6}$ alkenyl group, and a $C_{2-6}$ alkynyl group.

As used herein, the term "hydrolyzable group" refers to a group that is able to undergo a hydrolysis reaction, that is, refers to a group that can be removed from the main backbone of a compound by a hydrolysis reaction. Examples of the hydrolyzable group include $-OR^h$, $-OCOR^h$, $-O-N=CR^h{}_2$, $-NR^h{}_2$, $-NHR^h$, and halogen (in these formulae, $R^h$ represents a substituted or unsubstituted $C_{1-4}$ alkyl group).

The fluoropolyether group-containing compound of the present disclosure is a compound of the following formula (1) or (2).

(1)

(2)

In the above formula (1), $R^{F1}$ is each independently at each occurrence $Rf^1-R^F-O_q-$.

In the above formula (2), $R^{F2}$ is $-Rf^2{}_p-R^F-O_q-$.

In the above formula, $Rf^1$ is each independently at each occurrence a $C_{1-16}$ alkyl group optionally substituted with one or more fluorine atoms.

In the above $C_{1-16}$ alkyl group optionally substituted with one or more fluorine atoms, the "$C_{1-16}$ alkyl group" may be straight or branched, and it is preferably a straight or branched $C_{1-6}$ alkyl group, in particular $C_{1-3}$ alkyl group, and more preferably a straight $C_{1-6}$ alkyl group, in particular $C_{1-3}$ alkyl group.

The above $Rf^1$ is preferably a $C_{1-16}$ alkyl group substituted with one or more fluorine atoms, more preferably a $CF_2H-C_{1-15}$ perfluoroalkylene group, and even more preferably a $C_{1-16}$ perfluoroalkyl group.

The above $C_{1-16}$ perfluoroalkyl group may be straight or branched, and it is preferably a straight or branched $C_{1-6}$ perfluoroalkyl group, in particular $C_{1-3}$ perfluoroalkyl group, more preferably a straight $C_{1-6}$ perfluoroalkyl group, in particular $C_{1-3}$ perfluoroalkyl group, and specifically $-CF_3$, $-CF_2CF_3$, or $-CF_2CF_2CF_3$.

In the above formula, $Rf^2$ is a $C_{1-6}$ alkylene group optionally substituted with one or more fluorine atoms.

In the above $C_{1-6}$ alkylene group optionally substituted with one or more fluorine atoms, the "$C_{1-6}$ alkylene group" may be straight or branched, and it is preferably a straight or branched $C_{1-3}$ alkylene group, and more preferably a straight $C_{1-3}$ alkylene group.

The above $Rf^2$ is preferably a $C_{1-6}$ alkylene group substituted with one or more fluorine atoms, more preferably a $C_{1-6}$ perfluoroalkylene group, and even more preferably a $C_{1-3}$ perfluoroalkylene group.

The above $C_{1-6}$ perfluoroalkylene group may be straight or branched, and it is preferably a straight or branched $C_{1-3}$ perfluoroalkylene group, more preferably a straight $C_{1-3}$ perfluoroalkyl group, and specifically $-CF_2-$, $-CF_2CF_2-$, or $-CF_2CF_2CF_2-$.

In the above formula, p is 0 or 1. In one embodiment, p is 0. In another embodiment, p is 1.

In the above formulae, q is each independently at each occurrence 0 or 1. In one embodiment, q is 0. In another embodiment, q is 1.

In the above formulae (1) and (2), $R^F$ is each independently at each occurrence a fluoropolyether group represented by the following formula. The structure described as $R^F$ is bonded to the structure represented by $Rf^1$ on the left side in the formula (1), and is bonded to the structure represented by $Rf^2{}_p$ on the left side in the formula (2).

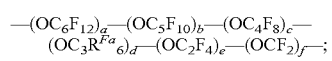

In the formula:

$R^{Fa}$ is each independently at each occurrence a hydrogen atom, a fluorine atom, or a chlorine atom; and a, b, c, d, e, and f are each independently an integer of 0 to 200, and the sum of a, b, c, d, e, and f is one or more.

The occurrence order of the respective repeating units enclosed in parentheses provided with a, b, c, d, e, or f is not limited in the formula.

$R^{Fa}$ is preferably a hydrogen atom or a fluorine atom, and more preferably a fluorine atom.

Preferably, a, b, c, d, e, and f are each independently an integer of 0 to 100.

The sum of a, b, c, d, e, and f is preferably 5 or more, and more preferably 10 or more, and it may be, for example, 15 or more or 20 or more. The sum of a, b, c, d, e, and f is preferably 200 or less, more preferably 100 or less, and even more preferably 60 or less, and it may be, for example, 50 or less or 30 or less.

These repeating units may be straight or branched, and are preferably straight. For example, —(OC$_6$F$_{12}$)— may be —(OCF$_2$CF$_2$CF$_2$CF$_2$CF$_2$CF$_2$)—, —(OCF(CF$_3$)CF$_2$CF$_2$CF$_2$CF$_2$)—, —(OCF$_2$CF(CF$_3$)CF$_2$CF$_2$CF$_2$)—, —(OCF$_2$CF$_2$CF(CF$_3$)CF$_2$CF$_2$)—, —(OCF$_2$CF$_2$CF$_2$CF(CF$_3$)CF$_2$)—, —(OCF$_2$CF$_2$CF$_2$CF$_2$CF(CF$_3$))—, or the like, and it is preferably —(OCF$_2$CF$_2$CF$_2$CF$_2$CF$_2$CF$_2$)—. —(OC$_5$F$_{10}$)— may be —(OCF$_2$CF$_2$CF$_2$CF$_2$CF$_2$)—, —(OCF(CF$_3$)CF$_2$CF$_2$CF$_2$)—, —(OCF$_2$CF(CF$_3$)CF$_2$CF$_2$)—, —(OCF$_2$CF$_2$CF(CF$_3$)CF$_2$)—, —(OCF$_2$CF$_2$CF$_2$CF(CF$_3$))—, or the like, and it is preferably —(OCF$_2$CF$_2$CF$_2$CF$_2$CF$_2$)—. —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)—, and —(OCF$_2$CF(C$_2$F$_5$))—, and it is preferably —(OCF$_2$CF$_2$CF$_2$CF$_2$)—. —(OC$_3$F$_6$)—(that is to say, in the above formula, $R^{Fa}$ is a fluorine atom) may be any of —(OCF$_2$CF$_2$CF$_2$)—, —(OCF(CF$_3$)CF$_2$)—, and —(OCF$_2$CF(CF$_3$))—, and it is preferably —(OCF$_2$CF$_2$CF$_2$)—. Also, —(OC$_2$F$_4$)— may be any of —(OCF$_2$CF$_2$)— and —(OCF(CF$_3$))—, and it is preferably —(OCF$_2$CF$_2$)—.

In one embodiment, $R^F$ is each independently at each occurrence a group represented by the following formula (f1), (f2), (f3), (f4), or (f5):

$$—(OC_3F_6)_d—$$ (f1)

wherein, d is an integer of 1 to 200, $$—(OC_4F_8)_c—(OC_3F_6)_d—(OC_2F_4)_e—(OCF_2)_f—$$ (f2)

wherein, c and d are each independently an integer of 0 or more and 30 or less, and e and f are each independently an integer of 1 or more and 200 or less;
the sum of c, d, e, and f is 2 or more; and
the occurrence order of the respective repeating units enclosed in parentheses provided with a subscript c, d, e, or f is not limited in the formula, $$—(R^6-R^7)_g—$$ (f3)

wherein, $R^6$ is OCF$_2$ or OC$_2$F$_4$;
$R^7$ is a group selected from OC$_2$F$_4$, OC$_3$F$_6$, OC$_4$F$_8$, OC$_5$F$_{10}$, and OC$_6$F$_{12}$, or a combination of two or three groups independently selected from these groups; and g is an integer of 2 to 100, $$—(OC_6F_{12})_a—(OC_5F_{10})_b—(OC_4F_8)_c—(OC_3F_6)_d—(OC_2F_4)_e—(OCF_2)_f—$$ (f4)

wherein, e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula, $$—(OC_6F_{12})_a—(OC_5F_{10})_b—(OC_4F_8)_c—(OC_3F_6)_d—(OC_2F_4)_e—(OCF_2)_f—$$ (f5)

wherein 9, f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

In the above formula (f1), d is preferably 5 to 200, more preferably 10 to 100, and even more preferably 15 to 50, and it is, for example, an integer of 25 to 35. The above formula (f1) is preferably a group represented by —(OCF$_2$CF$_2$CF$_2$)$_d$— or —(OCF(CF$_3$)CF$_2$)$_d$—, and more preferably a group represented by —(OCF$_2$CF$_2$CF$_2$)$_d$—.

In the above formula (f2), e and f are each independently an integer of preferably 5 or more and 200 or less, and more preferably 10 to 200. The sum of c, d, e, and f is preferably 5 or more, and more preferably 10 or more, and it may be, for example, 15 or more or 20 or more. In one embodiment, the above formula (f2) is preferably a group represented by —(OCF$_2$CF$_2$CF$_2$)$_c$—(OCF$_2$CF$_2$CF$_2$)$_d$—(OCF$_2$CF$_2$)$_e$—(OCF$_2$)$_f$—. In another embodiment, the formula (f2) may be a group represented by —(OC$_2$F$_4$)$_e$—(OCF$_2$)$_f$—.

In the above formula (f3), $R^6$ is preferably OC$_2$F$_4$. In the above formula (f3), $R^7$ is preferably a group selected from OC$_2$F$_4$, OC$_3$F$_6$, and OC$_4$F$_8$, or a combination of two or three groups independently selected from these groups, and more preferably a group selected from OC$_3$F$_6$ and OC$_4$F$_8$. Examples of the combination of two or three groups independently selected from OC$_2$F$_4$, OC$_3$F$_6$, and OC$_4$F$_8$ include, but are not limited to, —OC$_2$F$_4$OC$_3$F$_6$—, —OC$_2$F$_4$OC$_4$F$_8$—, —OC$_3$F$_6$OC$_2$F$_4$—, —OC$_3$F$_6$OC$_3$F$_6$—, —OC$_3$F$_6$OC$_4$F$_8$—, —OC$_4$F$_8$OC$_4$F$_8$—, —OC$_4$F$_8$OC$_3$F$_6$—, —OC$_4$F$_8$OC$_2$F$_4$—, —OC$_2$F$_4$OC$_2$F$_4$OC$_3$F$_6$—, —OC$_2$F$_4$OC$_2$F$_4$OC$_4$F$_8$—, —OC$_2$F$_4$OC$_3$F$_6$OC$_2$F$_4$—, —OC$_2$F$_4$OC$_3$F$_6$OC$_3$F$_6$—, —OC$_2$F$_4$OC$_4$F$_8$OC$_2$F$_4$—, —OC$_3$F$_6$OC$_2$F$_4$OC$_2$F$_4$—, —OC$_3$F$_6$OC$_2$F$_4$OC$_3$F$_6$—, —OC$_3$F$_6$OC$_3$F$_6$OC$_2$F$_4$—, and —OC$_4$F$_8$OC$_2$F$_4$OC$_2$F$_4$—. In the above formula (f3), g is an integer of preferably 3 or more, and more preferably 5 or more. The above g is preferably an integer of 50 or less. In the above formula (f3), OC$_2$F$_4$, OC$_3$F$_6$, OC$_4$F$_8$, OC$_5$F$_{10}$, and OC$_6$F$_{12}$ may be either straight or branched, and are preferably straight. In this embodiment, the above formula (f3) is preferably —(OC$_2$F$_4$—OC$_3$F$_6$)$_g$— or —(OC$_2$F$_4$—OC$_4$F$_8$)$_g$—.

In the above formula (f4), e is an integer of preferably 1 or more and 100 or less, and more preferably 5 or more and 100 or less. The sum of a, b, c, d, e, and f is preferably 5 or more, and more preferably 10 or more, and it is, for example, 10 or more and 100 or less.

In the above formula (f5), f is an integer of preferably 1 or more and 100 or less, and more preferably 5 or more and 100 or less. The sum of a, b, c, d, e, and f is preferably 5 or more, and more preferably 10 or more, and it is, for example, 10 or more and 100 or less.

In one embodiment, the above $R^F$ is a group represented by the above formula (f1).

In one embodiment, the above $R^F$ is a group represented by the above formula (f2).

In one embodiment, the above $R^F$ is a group represented by the above formula (f3).

In one embodiment, the above $R^F$ is a group represented by the above formula (f4).

In one embodiment, the above $R^F$ is a group represented by the above formula (f5).

In the above $R^F$, the ratio of e to f (hereinafter, referred to as an "e/f ratio") is 0.1 to 10, preferably 0.2 to 5, more preferably 0.2 to 2, even more preferably 0.2 to 1.5, and still more preferably 0.2 to 0.85. By setting the e/f ratio to be 10 or less, the lubricity, friction durability, and chemical resistance (for example, durability against artificial sweat) of a cured layer (for example, surface-treating layer) obtained from the compound are further improved. The smaller the e/f ratio is, the more improved the lubricity and the friction durability of the cured layer (for example, surface-treating layer) are. On the other hand, by setting the e/f ratio to be 0.1 or more, the stability of the compound can be further enhanced. The larger the e/f ratio is, the more improved the stability of the compound is.

In one embodiment, the e/f ratio is preferably 0.2 to 0.95, and more preferably 0.2 to 0.9.

In one embodiment, from the viewpoint of heat resistance, the e/f ratio is preferably 1.0 or more, and more preferably 1.0 to 2.0.

In one embodiment, the e/f ratio is 0.2 to 1.5, and preferably 0.5 to 1.1.

In one embodiment, the e/f ratio is 0.6 to 1.5.

In the above fluoropolyether group-containing compound, the number average molecular weight of the $R^{F1}$ and $R^{F2}$ moieties is not limited, and it is, for example, 500 to 30,000, preferably 1,500 to 30,000, more preferably 2,000 to 20,000, and even more preferably 2,000 to 15,000. Herein, the number average molecular weight of $R^{F1}$ and $R^{F2}$ is defined as a value obtained by $^{19}F$-NMR.

In another embodiment, the number average molecular weight of the $R^{F1}$ and $R^{F2}$ moieties is 500 to 30,000, preferably 1,000 to 20,000, more preferably 2,000 to 15,000, and even more preferably 2,000 to 10,000, and it may be, for example, 3,000 to 6,500.

In another embodiment, the number average molecular weight of the $R^{F1}$ and $R^{F2}$ moieties may be 4,000 to 30,000, preferably 5,000 to 10,000, and more preferably 6,000 to 10,000.

In the formulae (1) and (2), X is understood to be a linker moiety that bonds the group represented by $R^{F1}$ or $R^{F2}$ and the group represented by $R^{Si}$. Here, in the compounds represented by the formulae (1) and (2), the group represented by $R^{F1}$ or $R^{F2}$ is a group containing a fluoropolyether group that mainly provides water-repellency, surface lubricity, and the like, and the group represented by $R^{Si}$ is a silane moiety that provides binding ability to a substrate.

By having the structure as described above, the fluoropolyether group-containing compound of the present disclosure can contribute to formation of a cured layer (for example, surface-treating layer) having good friction durability (for example, skin friction durability, fabric friction durability, eraser friction durability, and steel wool friction durability), chemical resistance (for example, durability against solvents, durability against artificial sweat, and durability against acidity or alkalinity), water-repellency, oil-repellency, antifouling property (for example, preventing fouling such as fingerprints from adhering), waterproof property (preventing water from penetrating into electronic components and the like), waterproof property (preventing water from flooding into, for example, electronic components and the like), surface lubricity (or lubricity, such as wiping property for fouling including fingerprints and the like and excellent tactile sensations to the fingers), or the like.

The above X is a group represented by the following formula. In the formulae (1) and (2), the left side of the following formula connects to the group represented by $R^{F1}$ or $R^{F2}$, and the right side connects to the group represented by $R^{Si}$.

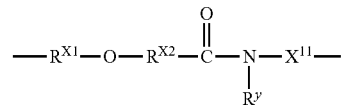

By using the fluoropolyether group-containing compound of the present disclosure, the physical properties (for example, friction durability, chemical resistance, water-repellency, oil-repellency, antifouling property, and lubricity) of the cured layer (for example, surface-treating layer) to be formed can be made good. This is thought to be because the group represented by X has high flexibility, which allows the reaction between the terminal portion of the group represented by $R^{Si}$ and the substrate to proceed particularly well.

The above $R^{X1}$ is each independently at each occurrence a $C_{1-6}$ alkylene group and preferably a $C_{1-3}$ alkylene group, and it is, for example, a methylene group.

The above $R^{X2}$ is each independently at each occurrence a $C_{1-6}$ alkylene group (preferably, a $C_{1-3}$ alkylene group, for example a methylene group) optionally substituted with a $C_{1-6}$ alkyl group or a cyclic alkyl group optionally containing one or more nitrogen atoms, oxygen atoms, sulfur atoms, or silicon atoms, or with a perfluoroalkyl group. Here, when a nitrogen atom, an oxygen atom, a sulfur atom, or a silicon atom is contained in the $C_{1-6}$ alkyl group or the cyclic alkyl group, these atoms are contained in the molecular chain of the $C_{1-6}$ alkyl group or the cyclic alkyl group (that is, between carbon atoms).

The above $R^{X2}$ is, each independently at each occurrence, preferably a $C_{1-6}$ alkylene group and more preferably a $C_{1-3}$ alkylene group, and it is, for example, a methylene group.

In one embodiment, $R^{X1}$ is a $C_{1-6}$ alkylene group and $R^{X2}$ is a $C_{1-6}$ alkylene group, and preferably, $R^{X1}$ is a $C_{1-3}$ alkylene group and $R^{X2}$ is a $C_{1-3}$ alkylene group. For example, $R^{X1}$ and $R^{X2}$ are both methylene groups.

The above $R^y$ is each independently at each occurrence a hydrogen atom, a $C_{1-6}$ alkyl group, or a phenyl group, preferably a hydrogen atom or a $C_{1-6}$ alkyl group, more preferably a hydrogen atom or a $C_{1-3}$ alkyl group, and particularly preferably a hydrogen atom or a methyl group.

The above $X^{11}$ is each independently at each occurrence a single bond, an oxygen atom, or a divalent organic group.

In one embodiment, $X^{11}$ is a single bond.

In one embodiment, $X^{11}$ is an oxygen atom.

In one embodiment, $X^{11}$ is a divalent organic group.

$X^{11}$ is preferably a $C_{1-6}$ alkylene group. Such a $C_{1-6}$ alkylene group may be straight or may be branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, but are preferably unsubstituted.

In a preferred embodiment, $X^{11}$ is a $C_{1-3}$ alkylene group, and it is, for example, a methylene group. Such a structure is advantageous in terms of improving the friction durability, chemical resistance, water-repellency, oil-repellency, antifouling property, waterproof property, surface lubricity, or the like of the cured layer (for example, surface-treating layer) to be formed.

In a preferred embodiment, in the above X, for example:
$R^{X1}$ is a $C_{1-6}$ alkylene group, and preferably a $C_{1-3}$ alkylene group, for example a methylene group;
$R^{X2}$ is a $C_{1-6}$ alkylene group, and preferably a $C_{1-3}$ alkylene group, for example a methylene group;
$R^y$ is a hydrogen atom or a $C_{1-6}$ alkyl group, preferably a hydrogen atom or a $C_{1-3}$ alkyl group, and more preferably a hydrogen atom or a methyl group; and
$X^{11}$ is a $C_{1-6}$ alkylene group, and preferably a $C_{1-3}$ alkylene group, for example a methylene group.

$R^{Si}$ is each independently at each occurrence represented by the following formula (S1):

(S1)

In the formula (S1), $R^{d1}$ is each independently at each occurrence $-Z^2-CR^{31}_{p2}R^{32}_{q2}R^{33}_{r2}$.

$Z^2$ is each independently at each occurrence a single bond, an oxygen atom, or a divalent organic group. The right side of the group described as $Z^2$ is bonded to the carbon atom of the group represented by $CR^{31}_{p2}R^{32}_{q2}R^{33}_{r2}$.

$Z^2$ is preferably a divalent organic group. It is preferably a $C_{1-6}$ alkylene group, $-(CH_2)_{z5'}-O-(CH_2)_{z6'}-$ (wherein, z5' is an integer of 0 to 6 such as an integer of 1 to 6, and z6' is an integer of 0 to 6 such as an integer of 1 to 6), or $-(CH_2)_{z7'}$-phenylene-$(CH_2)_{z8'}-$ (wherein, z7' is an integer of 0 to 6 such as an integer of 1 to 6, and z8' is an integer of 0 to 6 such as an integer of 1 to 6). The $C_{1-6}$ alkylene group may be straight or may be branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, but are preferably unsubstituted.

In a preferred embodiment, $Z^2$ is a $C_{1-6}$ alkylene group or $-(CH_2)_{z8'}$-phenylene-$(CH_2)_{z8'}-$, and preferably-phenylene-$(CH_2)_{z8'}-$. When $Z^2$ is such a group, light resistance, in particular ultraviolet resistance, can be further enhanced.

In another preferred embodiment, the above $Z^2$ is a $C_{1-3}$ alkylene group.

In one embodiment, $Z^2$ may be $-CH_2CH_2CH_2-$. In another embodiment, $Z^2$ may be $-CH_2CH_2-$.

$R^{31}$ is each independently at each occurrence $-Z^{2'}-CR^{32'}_{q2'}R^{33'}_{r2'}$.

$Z^{2'}$ is each independently at each occurrence a single bond, an oxygen atom, or a divalent organic group.

Hereinafter, the right side of the structure described as $Z^{2'}$ is bonded to $(CR^{32'}_{q2'}R^{33'}_{r2'})$.

The above $Z^{2'}$ is preferably a $C_{1-6}$ alkylene group, $-(CH_2)_{z51}-O-(CH_2)_{z61}-$ (wherein, z51 is an integer of 0 to 6 such as an integer of 1 to 6, and z61 is an integer of 0 to 6 such as an integer of 1 to 6), or $-(CH_2)_{z71}$-phenylene-$(CH_2)_{z81}-$ (wherein, z71 is an integer of 0 to 6 such as an integer of 1 to 6, and z81 is an integer of 0 to 6 such as an integer of 1 to 6). The $C_{1-6}$ alkylene group may be straight or branched, and is preferably straight. These groups may be substituted with, for example, one or more substituents selected from a fluorine atom, a $C_{1-6}$ alkyl group, a $C_{2-6}$ alkenyl group, and a $C_{2-6}$ alkynyl group, but are preferably unsubstituted.

In a preferred embodiment, $Z^{2'}$ is a $C_{1-6}$ alkylene group or $-(CH_2)_{z71}$-phenylene-$(CH_2)_{z81}-$, and preferably-phenylene-$(CH_2)_{z81}-$. When $Z^{2'}$ is such a group, light resistance, in particular ultraviolet resistance, can be further enhanced.

In another preferred embodiment, the above $Z^{2'}$ is a $C_{1-3}$ alkylene group. In one embodiment, $Z^{2'}$ may be $-CH_2CH_2CH_2-$. In another embodiment, $Z^{2'}$ may be $-CH_2CH_2-$.

$R^{32'}$ is each independently at each occurrence $-Z^3-SiR^{34}_{n2}R^{35}_{3-n2}$.

$Z^3$ is each independently at each occurrence a single bond, an oxygen atom, or a divalent organic group. Hereinafter, the right side of the structure described as $Z^3$ is bonded to $(SiR^{34}_{n2}R^{35}_{3-n2})$.

In one embodiment, $Z^3$ is an oxygen atom.

In one embodiment, $Z^3$ is a divalent organic group.

The above $Z^3$ is preferably a $C_{1-6}$ alkylene group, $-(CH_2)_{z5''}-O-(CH_2)_{z6''}-$ (wherein, z5'' is an integer of 0 to 6 such as an integer of 1 to 6, and z6'' is an integer of 0 to 6 such as an integer of 1 to 6), or $-(CH_2)_{z7''}$-phenylene-$(CH_2)_{z8''}-$ (wherein, z7'' is an integer of 0 to 6 such as an integer of 1 to 6, and z8'' is an integer of 0 to 6 such as an integer of 1 to 6). The $C_{1-6}$ alkylene group may be straight or branched, and is preferably straight. These groups may be substituted with, for example, one or more substituents selected from a fluorine atom, a $C_{1-6}$ alkyl group, a $C_{2-6}$ alkenyl group, and a $C_{2-6}$ alkynyl group, but are preferably unsubstituted.

In a preferred embodiment, $Z^3$ is a $C_{1-6}$ alkylene group or $-(CH_2)_{z7''}$-phenylene-$(CH_2)_{z8''}-$, preferably a $C_{1-6}$ alkylene group, and more preferably a $C_{1-3}$ alkylene group. In one embodiment, $Z^3$ may be $-CH_2CH_2CH_2-$.

The above $R^{34}$ is each independently at each occurrence a hydroxyl group or a hydrolyzable group.

Preferably, $R^{34}$ is each independently at each occurrence a hydrolyzable group.

$R^{34}$ is, each independently at each occurrence, preferably $-OR^h$, $-OCOR^h$, $-O-N=CR^h_2$, $-NR^h_2$, $-NHR^h$, or halogen (wherein, $R^h$ represents a substituted or unsubstituted $C_{1-4}$ alkyl group), and more preferably $-OR^h$ (that is, an alkoxy group). Examples of $R^h$ include an unsubstituted alkyl group such as a methyl group, an ethyl group, a propyl group, an isopropyl group, a n-butyl group, and an isobutyl group; and a substituted alkyl group such as a chloromethyl group. Among such groups, an alkyl group, in particular an unsubstituted alkyl group, is preferable, and a methyl group or an ethyl group is more preferable. In one embodiment, $R^h$ is a methyl group, and in another embodiment, $R^h$ is an ethyl group.

The above $R^{35}$ is each independently at each occurrence a hydrogen atom or a monovalent organic group. The monovalent organic group is a monovalent organic group excluding the above hydrolyzable group.

$R^{35}$ is preferably a $C_{1-20}$ alkyl group, more preferably a $C_{1-6}$ alkyl group, and even more preferably a methyl group.

In the above formula, n2 is each independently an integer of 0 to 3 in each $(SiR^{34}_{n2}R^{35}_{3-n2})$ unit. However, it is preferable that at least one $(SiR^{34}_{n2}R^{35}_{3-n2})$ unit with n2 of 1 to 3 is present in the terminal portion of the formula (1) and the formula (2). That is, in the terminal portion, not all n2 can be zero at the same time. In other words, in the terminal portion of the formula (1) and the formula (2), it is preferable that at least one Si atom to which a hydroxyl group or a hydrolyzable group is bonded is present.

n2 is, each independently, an integer of preferably 1 to 3, more preferably 2 to 3, and even more preferably 3 in each $(SiR^{34}_{n2}R^{35}_{3-n2})$ unit.

The above $R^{33'}$ is each independently at each occurrence a hydrogen atom, a hydroxyl group, or a monovalent organic group. The monovalent organic group is a monovalent organic group excluding the above hydrolyzable group.

In $R^{33'}$, the monovalent organic group is preferably a $C_{1-20}$ alkyl group, more preferably a $C_{1-6}$ alkyl group, and even more preferably a methyl group.

In one embodiment, $R^{33'}$ is a hydroxyl group.

In another embodiment, $R^{33'}$ is the monovalent organic group, preferably a $C_{1-20}$ alkyl group, and more preferably a $C_{1-6}$ alkyl group.

The above q2' is each independently at each occurrence an integer of 0 to 3, and the above r2' is each independently at each occurrence an integer of 0 to 3. The sum of q2' and r2' is 3 in the $(CR^{32'}_{q2'}R^{33'}_{r2'})$ unit.

q2' is, each independently, an integer of preferably 1 to 3, more preferably 2 to 3, and even more preferably 3 in each $(CR^{32'}_{q2'}R^{33'}_{r2'})$ unit.

$R^{32}$ is each independently at each occurrence $—Z^3—SiR^{34}_{n2}R^{35}_{3-n2}$. $—Z^3—SiR^{34}_{n2}R^{35}_{3-n2}$ is as defined for $R^{32'}$.

The above $R^{33}$ is each independently at each occurrence a hydrogen atom, a hydroxyl group, or a monovalent organic group. The monovalent organic group is a monovalent organic group excluding the above hydrolyzable group.

In $R^{33}$, the monovalent organic group is preferably a $C_{1-20}$ alkyl group, more preferably a $C_{1-6}$ alkyl group, and even more preferably a methyl group.

In one embodiment, $R^{33}$ is a hydroxyl group.

In another embodiment, $R^{33}$ is a monovalent organic group, preferably a $C_{1-20}$ alkyl group, and more preferably a $C_{1-6}$ alkyl group.

The above p2 is each independently at each occurrence an integer of 0 to 3, q2 is each independently at each occurrence an integer of 0 to 3, and r2 is each independently at each occurrence an integer of 0 to 3. The sum of p2, q2, and r2 is 3 in the $(CR^{31}_{p2}R^{32}_{q2}R^{33}_{r2})$ unit.

In one embodiment, p2 is 0.

In one embodiment, p2 may be each independently an integer of 1 to 3, an integer of 2 to 3, or 3 in each $(CR^{31}_{p2}R^{32}_{q2}R^{33}_{r2})$ unit. In a preferred embodiment, p2' is 3.

In one embodiment, q2 is each independently an integer of 1 to 3, preferably an integer of 2 to 3, and more preferably 3 in each $(CR^{31}_{p2}R^{32}_{q2}R^{33}_{r2})$ unit.

In one embodiment, p2 is 0, and q2 is each independently an integer of 1 to 3, preferably an integer of 2 to 3, and even more preferably 3 in each $(CR^{31}_{p2}R^{32}_{q2}R^{33}_{r2})$ unit.

$R^{e1}$ is each independently at each occurrence $—Z^3—SiR^{34}_{n2}R^{35}_{3-n2}$. $—Z^3—SiR^{34}_{n2}R^{35}_{3-n2}$ is as defined for $R^{32'}$.

$R^{f1}$ is each independently at each occurrence a hydrogen atom, a hydroxyl group, or a monovalent organic group. The monovalent organic group is a monovalent organic group excluding the above hydrolyzable group.

In $R^{f1}$, the monovalent organic group is preferably a $C_{1-20}$ alkyl group, more preferably a $C_{1-6}$ alkyl group, and even more preferably a methyl group.

In one embodiment, $R^{f1}$ is a hydroxyl group.

In another embodiment, $R^{f1}$ is a monovalent organic group, preferably a $C_{1-20}$ alkyl group, and more preferably a $C_{1-6}$ alkyl group.

The above k2 is each independently at each occurrence an integer of 0 to 3, l2 is each independently at each occurrence an integer of 0 to 3, and m2 is each independently at each occurrence an integer of 0 to 3. The sum of k2, l2, and m2 is 3 in the $(CR^{d1}_{k2}R^{e1}_{l2}R^{f1}_{m2})$ unit.

In one embodiment, n2 is 1 to 3, preferably 2 or 3, and more preferably 3. The $(SiR^{34}_{n2}R^{35}_{3-n2})$ unit is present in each terminal portion of the formula (1) and the formula (2) in 2 or more units, for example, 2 to 27 units, preferably 2 to 9 units, more preferably 2 to 6 units, even more preferably 2 to 3 units, and particularly preferably 3 units.

In a preferred embodiment, when $R^{32'}$ is present, in at least one, preferably all $R^{32'}$, n2 is an integer of 1 to 3, preferably 2 or 3, and more preferably 3.

In a preferred embodiment, when $R^{32}$ is present, in at least one, preferably all $R^{32}$, n2 is an integer of 1 to 3, preferably 2 or 3, and more preferably 3.

In a preferred embodiment, when $R^{e1}$ is present, in at least one, preferably all $R^{e1}$, n2 is an integer of 1 to 3, preferably 2 or 3, and more preferably 3.

In a preferred embodiment, k2 is 0, l2 is 2 or 3 and preferably 3, and n2 is 2 or 3 and preferably 3.

In one embodiment, the fluoropolyether group-containing compound of the present disclosure is represented by the following formula (1) or 0 (2).

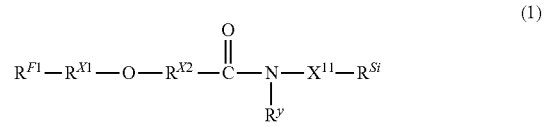

(1)

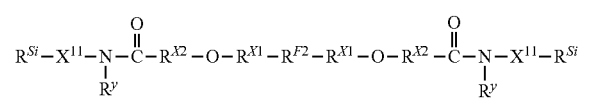

(2)

In the formula:
$R^{F1}$ is $Rf^1—R^F—O_q—$;
$R^{F2}$ is $—Rf^2_p—R^F—O_q—$;
$Rf^1$ is a $C_{1-16}$ alkyl group optionally substituted with one or more fluorine atoms;
$Rf^2$ is a $C_{1-6}$ alkylene group optionally substituted with one or more fluorine atoms;
$R^F$ is each independently at each occurrence a group represented by the following formula (f1), (f2), (f3), (f4), or (f5):

in the formula (f1), d is an integer of 1 to 200,

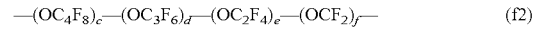

in the formula (f2), c and d are each independently an integer of 0 or more and 30 or less, and e and f are each independently an integer of 1 or more and 200 or less;
the sum of c, d, e, and f is 2 or more; and
the occurrence order of the respective repeating units enclosed in parentheses provided with a subscript c, d, e, or f is not limited in the formula,

in the formula (f3), $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or a combination of two or three groups independently selected from these groups; and
g is an integer of 2 to 100,

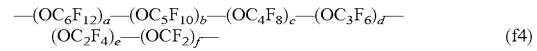

in the formula (f4), e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula, and

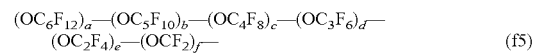

in the formula (f5), f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula;

p is 0 or 1;

q is 0 or 1;

$R^{X1}$ is a $C_{1-6}$ alkylene group, and preferably a $C_{1-3}$ alkylene group, for example a methylene group;

$R^{X2}$ is a $C_{1-6}$ alkylene group, and preferably a $C_{1-3}$ alkylene group, for example a methylene group;

$R^y$ is a hydrogen atom or a $C_{1-3}$ alkyl group, and more preferably a hydrogen atom or a methyl group;

$X^{11}$ is a $C_{1-6}$ alkylene group, and preferably a $C_{1-3}$ alkylene group, for example a methylene group;

$R^{Si}$ is represented by $-CR^{e1}_{3}$;

$R^{e1}$ is represented by $-Z^3-SiR^{34}_{n2}R^{35}_{3-n2}$;

$Z^3$ is a $C_{1-6}$ alkylene group, and preferably a $C_{1-3}$ alkylene group;

n2 is 2 or 3, and preferably 3;

$R^{34}$ is a hydrolyzable group; and $R^{35}$ is a $C_{1-6}$ alkyl group, and preferably a methyl group.

The compound represented by the formula (1) or the formula (2) can be produced by combining known methods.

As one embodiment, without limitations, an example of the method suited for producing the fluoropolyether group-containing compound of the present disclosure represented by the formula (1) will be described below.

The fluoropolyether group-containing compound of the present disclosure can be produced by a method including a step of allowing, for example, a compound represented by the formula (1c), $HSiM_3$ (wherein, M is each independently a halogen atom (that is, I, Br, Cl, or F) or a C1-6 alkoxy group, preferably a halogen atom, and more preferably Cl), if desired, a compound represented by $R^{34}L'$ ($R^{34}$ has the same definition as described above, and L' represents a group that can be bonded to $R^{34}$), and/or a compound represented by $R^{35}L''$ ($R^{35}$ has the same definition as described above, and L'' represents a group that can be bonded to $R^{35}$) to react with each other.

In the following method, the case where 12 in the formula (1) is 3 is shown.

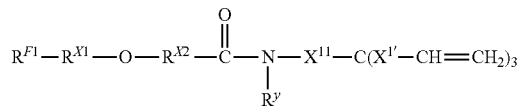

(1c)

In the formula (1c), $R^{F1}$, $R^{x1}$, $R^{x2}$, $R^y$, and $X^{11}$ have the same definitions as $R^{F1}$, $R^{x1}$, $R^{x2}$, $R^y$, and $X^{11}$ in the above formula (1), respectively. $X^{1'}$ represents a structure with two fewer carbon atoms than $Z^3$ in the formula (1). $-X^{1'}-CH_2CH_2-$ derived from the structure represented by $-X^{1'}-CH=CH_2$ corresponds to $Z^3$ in the formula (1).

The above step is preferably carried out in an appropriate solvent in the presence of an appropriate catalyst.

The suitable catalyst is not limited, and examples thereof include Pt, Pd, and Rh. The catalyst may be in any form, for example, in the form of a complex.

The suitable solvent is not limited as long as it does not adversely affect the reaction, and examples thereof include 1,3-bis(trifluoromethyl)benzene, perfluorobutyl ethyl ether, perfluorohexyl methyl ether, perfluorohexane, and hexafluorobenzene.

The reaction temperature in such a reaction is not limited, and it is usually 0 to 100° C. and preferably 50 to 80° C.; the reaction time is not limited, and it is usually 60 to 600 minutes and preferably 120 to 300 minutes; and the reaction pressure is not limited, and it is −0.2 to 1 MPa (gauge pressure) and is conveniently ambient pressure.

The compound represented by the above formula (1c) can be produced by, for example, introducing a group having a double bond into the terminal portion of the compound represented by the formula (1b), although there are no limitations. Specifically, it can be obtained by allowing the compound represented by the following formula (1b) and an amine compound having a double bond at the terminal portion (for example, 2,2-di(2-propenyl)-4-pentylamine or the like) to react with each other. $R^X$ is a hydrogen atom, a hydroxyl group, an alkoxyl group having 1 to 10 carbon atoms, an alkyl group having 1 to 10 carbon atoms, a phenol group, a sulfonyl group, halogen, or the like, and it is specifically halogen.

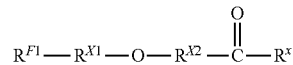

(1b)

The above step is preferably carried out in an appropriate solvent in the presence of an appropriate base.

The suitable base is not limited, and examples thereof include lithium hydroxide, sodium hydroxide, potassium hydroxide, sodium carbonate, potassium carbonate, sodium hydrogen carbonate, potassium hydrogen carbonate, and tertiary amines (triethylamine, pyridine, diisopropylethylamine, and 2,6-lutidine). Such a base may be in any form.

The suitable solvent is not limited as long as it does not adversely affect the reaction and examples thereof include 1,3-bis(trifluoromethyl)benzene, perfluorobutyl ethyl ether, perfluorohexyl methyl ether, perfluorohexane, and hexafluorobenzene.

The reaction temperature in such a reaction is not limited, and it is usually 0 to 100° C. and preferably 40 to 80° C.; the reaction time is not limited, and it is usually 60 to 600 minutes and preferably 120 to 240 minutes; and the reaction pressure is not limited, and it is −0.2 to 1 MPa (gauge pressure) and is conveniently ambient pressure.

The compound represented by the above formula (1b) can be obtained by, for example, introducing Hal-$R^{x2}$—C (=O)—$R^x$ into the OH group at the terminal of the compound represented by the formula (1a), although there are no limitations. Here, Hal is a halogen atom such as a Br atom.

$R^{F1}-R^{X1}-OH$ (1a)

The above step is preferably conducted in an appropriate solvent in the presence of an appropriate base.

The suitable base is not limited, and examples thereof include lithium hydroxide, sodium hydroxide, potassium hydroxide, sodium carbonate, potassium carbonate, sodium hydrogen carbonate, potassium hydrogen carbonate, and tertiary amines (triethylamine, pyridine, diisopropylethylamine, and 2,6-lutidine). The base may be in any form.

The suitable solvent is not limited as long as it does not adversely affect the reaction, and examples thereof include 1,3-bis(trifluoromethyl)benzene, perfluorobutyl ethyl ether, perfluorohexyl methyl ether, perfluorohexane and hexafluorobenzene.

The reaction temperature in such a reaction is not limited, and it is usually 0 to 100° C. and preferably 50 to 100° C.; the reaction time is not limited, and it is usually 60 to 600 minutes and preferably 100 to 300 minutes; and the reaction pressure is not limited, and it is −0.2 to 1 MPa (gauge pressure) and is conveniently ambient pressure.

In another embodiment, the compound represented by the formula (1c) can be synthesized by, for example, a method including a step of allowing a compound represented by the formula (1a) and a compound represented by Hal-$R^{X2}$C(O)N($R^y$)$X^{11}$C($X^{1'}$—CH=CH$_2$)$_3$ to react with each other, although there are no limitations. Here, Hal, $R^{X2}$, $R^y$, $X^{11}$, $X^{1'}$, $R^{F1}$, and $R^{x1}$ each have the same definition as described above.

$$R^{F1}\text{—}R^{X1}\text{—OH} \qquad (1a)$$

The above step is preferably conducted in an appropriate solvent in the presence of an appropriate base.

The suitable base is not limited, and examples thereof include lithium hydroxide, sodium hydroxide, potassium hydroxide, sodium carbonate, potassium carbonate, sodium hydrogen carbonate, potassium hydrogen carbonate, and tertiary amines (triethylamine, pyridine, diisopropylethylamine, 2,6-lutidine). The base may be in any form.

The suitable solvent is not limited as long as it does not adversely affect the reaction and examples thereof include 1,3-bis(trifluoromethyl)benzene, perfluorobutyl ethyl ether, perfluorohexyl methyl ether, perfluorohexane and hexafluorobenzene.

The reaction temperature in the reaction is not limited and it is usually 0 to 100° C. and preferably 50 to 100° C.; the reaction time is not limited and it is usually 60 to 600 minutes and preferably 100 to 300 minutes; and the reaction pressure is not limited and it is −0.2 to 1 MPa (gauge pressure) and is conveniently ambient pressure.

The reaction conditions upon producing the fluoropolyether group-containing silane compound of the present disclosure can be adjusted to a preferred range as appropriate by those skilled in the art.

Next, a composition of the present disclosure (for example, a surface-treating agent) will be described.

The composition of the present disclosure (for example, a surface-treating agent) contains at least one fluoropolyether group-containing compound represented by the formula (1) or the formula (2).

In one embodiment, the composition of the present disclosure (for example, a surface-treating agent) may contain the fluoropolyether group-containing compounds represented by the formula (1) and the formula (2).

In one embodiment, the lower limit of the ratio (molar ratio) of the fluoropolyether group-containing compound represented by the formula (2) to the total of the fluoropolyether group-containing compounds represented by the formula (1) and the formula (2) in the composition of the present disclosure (for example, a surface-treating agent) may be preferably 0.001, more preferably 0.002, even more preferably 0.005, still more preferably 0.01, particularly preferably 0.02, and especially 0.05. The upper limit of the ratio (molar ratio) of the fluoropolyether group-containing compound represented by the formula (2) to the total of the fluoropolyether group-containing compounds represented by the formula (1) and the formula (2) may be preferably 0.35, more preferably 0.30, even more preferably 0.20, and still more preferably 0.15 or 0.10. The ratio (molar ratio) of the fluoropolyether group-containing compound represented by the formula (2) to the total of the fluoropolyether group-containing compounds represented by the formula (1) and the formula (2) is preferably 0.001 or more and 0.30 or less, more preferably 0.001 or more and 0.20 or less, even more preferably 0.002 or more and 0.20 or less, still more preferably 0.005 or more and 0.20 or less, and particularly preferably 0.01 or more and 0.20 or less, such as 0.02 or more and 0.15 or less or 0.05 or more and 0.15 or less. By including the compounds in the above range, the composition of the present disclosure can contribute to formation of a cured layer having good friction durability.

The composition of the present disclosure (for example, a surface-treating agent) can impart water-repellency, oil-repellency, antifouling property, waterproof property, surface lubricity, and friction durability to a substrate, and may be suitably used as an antifouling coating agent or waterproof coating agent, although there are no limitations.

The composition of the present disclosure (for example, a surface-treating agent) may further contain a solvent, a (unreactive) fluoropolyether compound that can be understood as a fluorine-containing oil, preferably a perfluoro(poly)ether compound (hereinafter, collectively referred to as a "fluorine-containing oil"), a (unreactive) silicone compound that can be understood as a silicone oil (hereinafter, referred to as a "silicone oil"), a catalyst, a surfactant, a polymerization inhibitor, a sensitizer, and the like.

Examples of the above solvent include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane (HCFC 225), Zeorora H, HFE 7100, HFE 7200, and HFE 7300. Alternatively, the solvent may be a mixed solvent of two or more of such solvents.

The fluorine-containing oil is not limited, and examples thereof include a compound (perfluoro(poly)ether compound) represented by the following general formula (3).

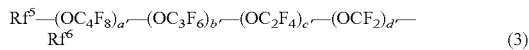

$$Rf^5—(OC_4F_8)_{a'}—(OC_3F_6)_{b'}—(OC_2F_4)_{c'}—(OCF_2)_{d'}—Rf^6 \quad (3)$$

In the formula, $Rf^5$ represents an alkyl group having 1 to 16 carbon atoms optionally substituted with one or more fluorine atoms (preferably, a $C_{1-16}$ perfluoroalkyl group), $Rf^6$ represents an alkyl group having 1 to 16 carbon atoms optionally substituted with one or more fluorine atoms (preferably, a $C_{1-16}$ perfluoroalkyl group), a fluorine atom, or a hydrogen atom, and $Rf^5$ and $Rf^6$ are each independently, more preferably, a $C_{1-3}$ perfluoroalkyl group.

a', b', c', and d' respectively represent the numbers of 4 repeating units of perfluoro(poly)ether constituting the main backbone of the polymer and are mutually independently an integer of 0 or more and 300 or less, and the sum of a', b', c', and d' is at least 1, preferably 1 to 300, and more preferably 20 to 300. The occurrence order of the respective repeating units enclosed in parentheses provided with a subscript a', b', c', or d' is not limited in the formula. Among these repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)—, and (OCF$_2$CF(C$_2$F$_5$))—, and it is preferably —(OCF$_2$CF$_2$CF$_2$CF$_2$)—. —(OC$_3$F$_6$)— may be any of —(OCF$_2$CF$_2$CF$_2$)—, —(OCF(CF$_3$)CF$_2$)—, and (OCF$_2$CF(CF$_3$))—, and it is preferably —(OCF$_2$CF$_2$CF$_2$)—. —(OC$_2$F$_4$)— may be any of —(OCF$_2$CF$_2$)— and (OCF(CF$_3$))—, and it is preferably —(OCF$_2$CF$_2$)—.

Examples of the perfluoro(poly)ether compound represented by the above general formula (3) include a compound represented by any of the following general formulae (3a) and (3b) (which may be used singly or as a mixture of two or more).

$$Rf^5—(OCF_2CF_2CF_2)_{b''}—Rf^6 \quad (3a)$$

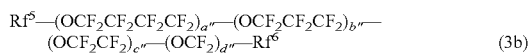

$$Rf^5—(OCF_2CF_2CF_2CF_2)_{a''}—(OCF_2CF_2CF_2)_{b''}—(OCF_2CF_2)_{c''}—(OCF_2)_{d''}—Rf^6 \quad (3b)$$

In these formulae, $Rf^5$ and $Rf^6$ are as described above; in the formula (3a), b" is an integer of 1 or more and 100 or less; and in the formula (3b), a" and b" are each independently an integer of 0 or more and 30 or less, and c" and d" are each independently an integer of 1 or more and 300 or less. The occurrence order of the respective repeating units enclosed in parentheses provided with a subscript a", b", c", or d" is not limited in the formulae.

From another viewpoint, the fluorine-containing oil may be a compound represented by the general formula: $Rf^3$—F wherein $Rf^3$ is a $C_{5-16}$ perfluoroalkyl group. The fluorine-containing oil may be a chlorotrifluoroethylene oligomer.

The above fluorine-containing oil may have an average molecular weight of 500 to 10,000. The molecular weight of the fluorine-containing oil may be measured using gel permeation chromatography (GPC).

The fluorine-containing oil may be contained in an amount of, for example, 0 to 50% by mass, preferably 0 to 30% by mass, and more preferably 0 to 5% by mass based on the composition of the present disclosure. In one embodiment, the composition of the present disclosure is substantially free of the fluorine-containing oil. Being substantially free of the fluorine-containing oil means that the fluorine-containing oil is not contained at all, or an extremely small amount of the fluorine-containing oil may be contained.

The fluorine-containing oil contributes to increasing the surface lubricity of a layer formed of the composition of the present disclosure.

For example, the above silicone oil may be a linear or cyclic silicone oil having 2,000 or less siloxane bonds. The linear silicone oil may be so-called a straight silicone oil or modified silicone oil. Examples of the straight silicone oil include dimethyl silicone oil, methyl phenyl silicone oil, and methyl hydrogen silicone oil. Examples of the modified silicone oil include those obtained by modifying a straight silicone oil with alkyl, aralkyl, polyether, higher fatty acid ester, fluoroalkyl, amino, epoxy, carboxyl, alcohol, or the like. Examples of the cyclic silicone oil include cyclic dimethylsiloxane oil.

In the composition of the present disclosure (for example, a surface-treating agent), such a silicone oil may be contained in an amount of, for example, 0 to 300 parts by mass, and preferably 50 to 200 parts by mass, based on total 100 parts by mass of the above fluoropolyether group-containing silane compound of the present disclosure (in the case of two or more kinds, the total thereof, and the same applies below).

The silicone oil contributes to increasing the surface lubricity of the surface-treating layer.

Examples of the above catalyst include an acid (for example, acetic acid, trifluoroacetic acid), a base (for example, ammonia, triethylamine, diethylamine) and a transition metal (for example, Ti, Ni, Sn).

The catalyst promotes hydrolysis and dehydrative condensation of the fluoropolyether group-containing silane compound of the present disclosure, and promotes formation of a layer formed of the composition of the present disclosure (for example, a surface-treating agent).

Examples of the other components include, in addition to those described above, tetraethoxysilane, methyltrimethoxysilane, 3-aminopropyltrimethoxysilane, 3-glycidoxypropyltrimethoxysilane, and methyltriacetoxysilane.

The composition of the present disclosure can be used as a surface-treating agent for surface treatment of a substrate.

The surface-treating agent of the present disclosure can be formed into pellets by impregnating a porous material such as a porous ceramic material or a metal fiber such as a fiber obtained by, for example, solidifying steel wool in a cotton-like form with the composition. Such pellets can be used in, for example, vacuum deposition.

Hereinafter, an article of the present disclosure will be described.

The article of the present disclosure includes: a substrate; and a layer (for example, a surface-treating layer) on the surface of the substrate, where the layer is formed of the fluoropolyether group-containing silane compound of the present disclosure or a surface-treating agent containing the fluoropolyether group-containing silane compound (hereinafter, these are simply referred to as a "surface-treating agent of the present disclosure", collectively).

The substrate that can be used in the present disclosure may be composed of any suitable material such as glass, a resin (which may be a natural or synthetic resin, for example, a common plastic material, and may be in the form of a plate, a film, or the like), a metal, ceramics, a semiconductor (such as silicon and germanium), a fiber (such as woven fabric and nonwoven fabric), fur, leather, a wood material, a ceramic material, a stone material, or a building material.

For example, when the article to be produced is an optical member, the material constituting the surface of the substrate may be a material for an optical member, such as glass or a transparent plastic. When the article to be produced is an optical member, some layer (or film) such as a hard coat layer or an antireflection layer may be formed on the surface (the outermost layer) of the substrate. The antireflection layer may be any of a single-layer antireflection layer and a multi-layer antireflection layer. Examples of inorganic substances that can be used in the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$. One of these inorganic substances may be used singly, or two or more may be used in combination (for example, as a mixture). In the case of a multi-layer antireflection layer, $SiO_2$ and/or SiO is preferably used in the outermost layer thereof. When the article to be produced is an optical glass component for a touch panel, a part of the surface of the substrate (glass) may have a transparent electrode such as a thin film in which indium tin oxide (ITO), indium zinc oxide, or the like is used. The substrate, according to its specific configuration or the like, may have an insulating layer, an adhesive layer, a protecting layer, a decorated frame layer (I—CON), an atomizing film layer, a hard coating layer, a polarizing film, a phase difference film, a liquid crystal display module, or the like.

The shape of the substrate is not limited. The surface region of the substrate on which a surface-treating layer is to be formed may be at least a part of the substrate surface, and may be suitably determined according to the application, specific specifications, and the like of an article to be produced.

The substrate, or at least the surface portion thereof, may be composed of a material originally having a hydroxyl group. Examples of the material include glass as well as metal (in particular, base metal) wherein a natural oxidized film or a thermal oxidized film is formed on the surface, ceramics, semiconductors, and the like. Alternatively, when the substrate has an insufficient amount of a hydroxyl group or when the substrate originally does not have a hydroxyl group as in resin and the like, a pre-treatment may be performed on the substrate to thereby introduce or increase a hydroxyl group on the surface of the substrate. Examples of such a pre-treatment include a plasma treatment (for example, corona discharge) and ion beam irradiation. The plasma treatment can be suitably utilized to not only introduce or increase a hydroxyl group on the substrate surface, but also clean the substrate surface (remove foreign matter and the like). Another example of such a pre-treatment includes a method wherein a monolayer of a surface adsorbent having a carbon-carbon unsaturated bonding group is formed on the surface of the substrate by a LB method (a Langmuir-Blodgett method), a chemical adsorption method, or the like beforehand, and thereafter cleaving the unsaturated bond under an atmosphere containing oxygen, nitrogen, or the like.

Alternatively, the substrate may be that of which at least the surface consists of a material comprising other reactive group such as a silicone compound having one or more Si—H group or alkoxysilane.

Then, on the surface of such a substrate, a layer of the above surface-treating agent of the present disclosure is formed, this layer is post-treated as necessary, and thereby a layer is formed from the surface-treating agent of the present disclosure.

The layer of the surface-treating agent of the present disclosure can be formed by applying the above composition on the surface of the substrate such that the composition coats the surface. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, a vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating by an atmospheric pressure plasma method can be performed.

When using the wet coating method, the surface-treating agent of the present disclosure can be applied to the substrate surface after being diluted with a solvent. From the viewpoint of the stability of the composition of the present disclosure and the volatility of solvents, the following solvents are preferably used: perfluoroaliphatic hydrocarbons having 5 to 12 carbon atoms (such as perfluorohexane, perfluoromethylcyclohexane, and perfluoro-1,3-dimethylcyclohexane); polyfluoroaromatic hydrocarbons (such as bis (trifluoromethyl)benzene); polyfluoroaliphatic hydrocarbons (such as $C_6F_{13}CH_2CH_3$ (such as Asahiklin (registered trademark) AC-6000 manufactured by Asahi Glass Co., Ltd., and 1,1,2,2,3,3,4-heptafluorocyclopentane (such as Zeorora (registered trademark) H manufactured by Zeon Corporation)); alkyl perfluoroalkyl ethers (the perfluoroalkyl group and the alkyl group may be straight or branched) such as hydrofluoroether (HFE) (such as perfluoropropylmethyl ether ($C_3F_7OCH_3$) (such as Novec (trademark) 7000 manufactured by Sumitomo 3M Limited), perfluorobutyl methyl ether ($C_4F_9OCH_3$) (such as Novec (trademark) 7100 manufactured by Sumitomo 3M Limited), perfluorobutyl ethyl ether ($C_4F_9OC_2H_5$) (such as Novec (trademark) 7200 manufactured by Sumitomo 3M Limited), and perfluorohexyl methyl ether ($C_2F_5CF(OCH_3)C_3F_7$) (such as Novec (trademark) 7300 manufactured by Sumitomo 3M Limited), or $CF_3CH_2OCF_2CHF_2$ (such as Asahiklin (registered trademark) AE-3000 manufactured by Asahi Glass Co., Ltd.)). One of these solvents can be used singly, or two or more can be used as a mixture. In particular, hydrofluoroether is preferable, and perfluorobutyl methyl ether ($C_4F_9OCH_3$) and/or perfluorobutyl ethyl ether ($C_4F_9OC_2H_5$) is particularly preferable.

When using the dry coating method, the surface-treating agent of the present disclosure may be directly subjected to the dry coating method, or may be diluted with the above solvent before being subjected to the dry coating method.

A layer of the surface-treating agent is preferably formed such that the surface-treating agent of the present disclosure coexists in the layer with a catalyst for hydrolysis and dehydrative condensation. Conveniently, in the case of a wet coating method, the surface-treating agent of the present disclosure is diluted with a solvent, and then, immediately before application to the substrate surface, a catalyst may be added to the diluted solution of the surface-treating agent of the present disclosure. In the case of a dry coating method, the surface-treating agent of the present disclosure to which a catalyst has been added is directly used to a deposition (usually vacuum deposition) treatment, or a pellet-like material may be used to a deposition (usually vacuum deposition) treatment, wherein the pellet is obtained by impregnating a porous body of metal such as iron or copper with the surface-treating agent of the present disclosure to which the catalyst has been added.

The catalyst may be any suitable acid or base. The acid catalyst may be, for example, acetic acid, formic acid, or trifluoroacetic acid. The base catalyst may be, for example, ammonia or organic amine.

In the above-described manner, a layer derived from the surface-treating agent of the present disclosure is formed on the substrate surface, and the article of the present disclosure is produced. The layer thus obtained has both high surface lubricity and high friction durability. The above layer may have not only high friction durability but also have, depending on the compositional features of the surface-treating agent used, water-repellency, oil-repellency, antifouling property (for example, preventing fouling such as fingerprints from adhering), waterproof property (preventing water from penetrating into electronic components and the like), waterproof property, surface lubricity (or lubricity, such as wiping property for fouling including fingerprints and the like and excellent tactile sensations to the fingers), and the like, and may be suitably utilized as a functional thin film.

That is to say, the present disclosure further relates to an optical material having the cured product in the outermost layer.

The optical material preferably includes a wide variety of optical materials in addition to optical materials relating to displays and the like as exemplified below: for example, displays such as cathode ray tubes (CRTs; e.g., PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on their surfaces.

The article having a layer obtained according to the present disclosure may be, but is not limited to, an optical member. Examples of the optical member include lenses of glasses or the like; front surface protective plates, antireflection plates, polarizing plates, and anti-glare plates for displays such as PDPs and LCDs; touch panel sheets for devices such as mobile phones and personal digital assistants; disc surfaces of optical discs such as Blu-ray (registered trademark) discs, DVD discs, CD-Rs, and MOs; optical fibers; and display surfaces of watches and clocks.

The article having a layer obtained according to the present disclosure may be an automobile interior or exterior member. Examples of the exterior material include the following: windows, light covers, and external camera covers. Examples of the interior material include the following: instrument panel covers, navigation system touch panels, and decorative interior materials.

The article having a layer obtained according to the present disclosure may be medical equipment or a medical material.

The thickness of the above layer is not limited. The thickness of the above layer in the case of an optical member is in the range of 1 to 50 nm, 1 to 30 nm, and preferably 1 to 15 nm, from the viewpoint of optical performance, surface lubricity, friction durability, and antifouling property.

Embodiments have been described above, but it will be understood that various modifications can be made to embodiments and details without departing from the spirit and the scope of the claims.

The present disclosure provides [1] to [15] below.

[1] A fluoropolyether group-containing compound of the following formula (1) or (2):

wherein $R^{F1}$ is $Rf^1—R^F—O_q—$;

$R^{F2}$ is $—Rf^2_p—R^F—O_q—$;

$Rf^1$ is a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a group represented by formula:

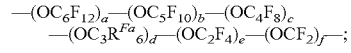

a, b, c, d, e, and f are each independently an integer of 0 to 200, and the sum of a, b, c, d, e, and f is one or more. The occurrence order of the respective repeating units enclosed in parentheses provided with a, b, c, d, e, or f is not limited in the formula;

$R^{Fa}$ is each independently at each occurrence a hydrogen atom, a fluorine atom, or a chlorine atom;

p is 0 or 1;

q is independently 0 or 1;

X is a group represented by the following formula:

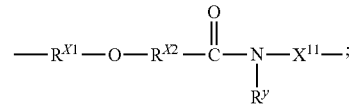

$R^{X1}$ is each independently at each occurrence a $C_{1-6}$ alkylene group;

$R^{X2}$ is each independently at each occurrence a $C_{1-6}$ alkylene group optionally substituted with a $C_{1-6}$ alkyl group or cyclic alkyl group optionally containing one or more nitrogen atoms, oxygen atoms, sulfur atoms, or silicon atoms, or with a perfluoroalkyl group;

$R^y$ is each independently at each occurrence a hydrogen atom, a $C_{1-6}$ alkyl group, or a phenyl group;

$X^{11}$ is each independently at each occurrence a single bond, an oxygen atom, or a divalent organic group;

$R^{Si}$ is each independently at each occurrence represented by the following formula (S1):

$R^{d1}$ is each independently at each occurrence $-Z^2-CR^{31}{}_{p2}R^{32}{}_{q2}R^{33}{}_{r2}$;

$Z^2$ is each independently at each occurrence a single bond, an oxygen atom, or a divalent organic group;

$R^{31}$ is each independently at each occurrence $-Z^{2'}-CR^{32'}{}_{q2'}R^{33'}{}_{r2'}$;

$Z^{2'}$ is each independently at each occurrence a single bond, an oxygen atom, or a divalent organic group;

$R^{32'}$ is each independently at each occurrence $-Z^3-SiR^{34}{}_{n2}R^{35}{}_{3-n2}$;

$R^{33'}$ is each independently at each occurrence a hydrogen atom, a hydroxyl group, or a monovalent organic group;

$q2'$ is each independently at each occurrence an integer of 0 to 3;

$r2'$ is each independently at each occurrence an integer of 0 to 3;

$Z^3$ is each independently at each occurrence a single bond, an oxygen atom, or a divalent organic group;

$R^{34}$ is each independently at each occurrence a hydroxyl group or a hydrolyzable group;

$R^{35}$ is each independently at each occurrence a hydrogen atom or a monovalent organic group;

n2 is each independently at each occurrence an integer of 0 to 3;

$R^{32}$ is each independently at each occurrence $-Z^3-SiR^{34}{}_{n2}R^{35}{}_{3-n2}$;

$R^{33}$ is each independently at each occurrence a hydrogen atom, a hydroxyl group, or a monovalent organic group;

p2 is each independently at each occurrence an integer of 0 to 3;

q2 is each independently at each occurrence an integer of 0 to 3;

r2 is each independently at each occurrence an integer of 0 to 3;

$R^{e1}$ is each independently at each occurrence $-Z^3-SiR^{34}{}_{n2}R^{35}{}_{3-n2}$;

$R^{f1}$ is each independently at each occurrence a hydrogen atom, a hydroxyl group, or a monovalent organic group;

k2 is each independently at each occurrence an integer of 0 to 3;

l2 is each independently at each occurrence an integer of 0 to 3; and m2 is each independently at each occurrence an integer of 0 to 3.

[2] The fluoropolyether group-containing compound according to [1], wherein $X^{11}$ is a divalent organic group.

[3] The fluoropolyether group-containing compound according to [1] or [2], wherein $X^{11}$ is a $C_{1-6}$ alkylene group.

[4] The fluoropolyether group-containing compound according to any one of [1] to [3], wherein n2 is 2 or 3.

[5] The fluoropolyether group-containing compound according to any one of [1] to [4], wherein k2 is 0 and l2 is 3.

[6] The fluoropolyether group-containing compound according to any one of [1] to [5], wherein $R^y$ is a hydrogen atom or a $C_{1-6}$ alkyl group.

[7] The fluoropolyether group-containing compound according to any one of [1] to [6], wherein $R^{Fa}$ is a fluorine atom.

[8] A surface-treating agent comprising the fluoropolyether group-containing compound according to any one of [1] to [7].

[9] The surface-treating agent according to [8], further comprising one or more other components selected from a fluorine-containing oil, a silicone oil, and a catalyst.

[10] The surface-treating agent according to [8] or [9], further comprising a solvent.

[11] The surface-treating agent according to any one of [8] to [10], which is used as an antifouling coating agent or a water-proof coating agent.

[12] The surface-treating agent according to any one of [8] to [11], which is for vacuum deposition.

[13] A pellet comprising the surface-treating agent according to any one of [8] to [12].

[14] An article comprising: a substrate; and a layer on a surface of the substrate, wherein the layer is formed of the compound according to any one of [1] to [7] or the surface-treating agent according to any one of [8] to [12].

[15] The article according to [14], which is an optical member.

EXAMPLES

The present disclosure will be described more specifically through the following Examples, but it is not limited to these Examples. In the Examples, all chemical formulae shown below indicate average compositional features, and the occurrence order of repeating units (such as ($OCF_2CF_2$) and ($OCF_2$)) constituting perfluoropolyether is arbitrary.

Synthetic Example 1

4.0 g of $CF_3-(OCF_2CF_2)_m-(OCF_2)_n-CH_2OH$ (m≈18 and n≈18) was dispersed in a mixed solvent of 3.0 g of 1,3-bis(trifluoromethyl)benzene and 2.0 g of diethylene glycol dimethyl ether. To that solution, 0.4 g of sodium hydroxide was added, and the mixture was stirred at 80° C. for 2 hours. To this mixture, 0.5 g of bromoacetic acid dissolved in 2.0 g of diethylene glycol dimethyl ether was added dropwise with vigorous stirring, and then the mixture was stirred at 80° C. for 3 hours. The end point of the reaction was confirmed by $^{19}$F-NMR according to that the chemical shift of the hydroxyl group β position $-CF_2-$ of $CF_3(OCF_2CF_2)_m-(OCF_2)_nCH_2OH$ shifted to a low magnetic field, and by 1H-NMR according to that the methylene proton at the carbonyl group α position of bromoacetic acid shifted to a high magnetic field. When the reaction solution was cooled to room temperature, it was separated into the liquid phase and the solid phase. 10 g of AK-225 was added to the solid phase after removing the liquid phase, and 10 g of 10 wt % sulfuric acid solution was added thereto with stirring. After stirring for 20 minutes, the mixture was left to stand still, the lower phase was separated, the lower phase was separated, the separated lower phase was washed with water twice, dried over magnesium sulfate, and concentrated. The obtained concentrated product was dissolved in perfluorohexane and washed with acetone three times, thereby affording a polyether group-containing compound (A).

Polyether group-containing compound (A):

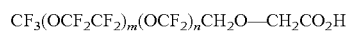

(m≈18 and n≈18)

Synthetic Example 2

3.0 g of the polyether group-containing compound (A) obtained in Synthetic Example 1 was dissolved in 5.0 g of 1,3-bis(trifluoromethyl)benzene and cooled with ice. After adding 0.3 g of thionyl chloride dropwise to that solution, 0.01 mg of N,N-dimethylformamide was added thereto, and the mixture was stirred at room temperature for 24 hours. Thionyl chloride was distilled off from this reaction solution, then 0.3 g of 2,2-di(2-propenyl)-4-pentylamine and 0.2 g of triethylamine were added thereto, and the mixture was heated to 50° C. and stirred for 3 hours. The end point of the reaction was confirmed by $^{19}$F-NMR according to that the chemical shift of the ether group β position —$CF_2$— of $CF_3$—$(OCF_2CF_2)_m$—$(OCF_2)_n$—$CH_2O$— shifted to a low magnetic field, and by 1H-NMR according to that the methylene proton at the amino group α position of 2,2-di($_2$-propenyl)-4-pentylamine shifted to a low magnetic field. 1N-hydrochloric acid was added to the reaction solution, and the separated lower layer was washed with water, dried over magnesium sulfate, and concentrated. The obtained concentrated product was dissolved in perfluorohexane and washed with acetone three times, thereby affording a polyether group-containing compound (B).

Polyether group-containing compound (B):

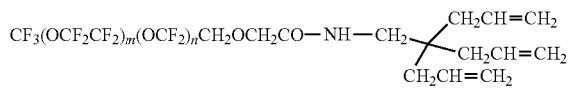

(m≈18 and n≈18)

Synthetic Example 3

3.0 g of the polyether group-containing compound (B) obtained in Synthetic Example 2 was dissolved in 6 g of 1,3-bis(trifluoromethyl)benzene, 0.02 g of triacetoxymethylsilane and 0.04 ml of a xylene solution containing 2% Pt complex of 1,3-divinyl-1,1,3,3-tetramethyldisiloxane were added thereto, then 0.8 g of trichlorosilane was introduced, and the mixture was stirred at 10° C. for 30 minutes. Subsequently, the obtained reaction solution was heated to 60° C. and stirred for 4 hours. Thereafter, volatiles were distilled off under reduced pressure, then a mixed solution of 0.1 g of methanol and 2.0 g of trimethyl orthoformate was added thereto, and the mixture was heated to 60° C. and stirred for 3 hours. Thereafter, purification was performed, and thus 2.9 g of the following polyether group-containing compound (C) having trimethoxysilyl groups at terminals was obtained.

Polyether group-containing compound (C):

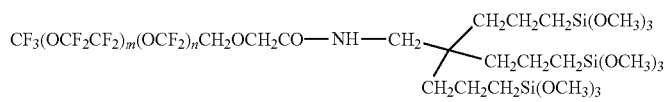

(m≈18 and n≈18)

Synthetic Example 4

4.0 g of $CF_3$—$(OCF_2CF_2)_m$—$(OCF_2)_n$—$CH_2OH$ (m≈18, n≈18) was dispersed in a mixed solvent of 3.0 g of 1,3-bis(trifluoromethyl)benzene and 2.0 g of diethylene glycol dimethyl ether. To that solution, 0.4 g of sodium hydroxide was added and the mixture was stirred at 80° C. for 2 hours. To this mixture, 0.5 g of N-{2,2-di(2-propenyl)-4-pentyl}amino-2-chloroacetic acid amide ($ClCH_2CONHCH_2C(CH_2CH=CH_2)_3$) dissolved in 2.0 g of diethylene glycol dimethyl ether was added dropwise with vigorous stirring, and then the mixture was stirred at 80° C. for 3 hours. The end point of the reaction was confirmed by $^{19}$F-NMR according to that the chemical shift of the carbonyl group β position —$CF_2$— of $CF_3(OCF_2CF_2)_m$—$(OCF_2)_nCH_2OH$ shifted to a low magnetic field, and by 1H-NMR according to that the methylene proton at the carbonyl group α position of the above chloroacetic acid shifted to a high magnetic field. The reaction solution was cooled to room temperature, and 10 g of 1N-hydrochloric acid was added thereto with stirring. After stirring for 5 minutes, the mixture was left to stand still, and the lower layer was separated, washed with water twice, dried over magnesium sulfate, and concentrated. The obtained concentrated product was dissolved in perfluorohexane and washed with acetone three times, thereby affording a polyether group-containing compound (D).

Polyether group-containing compound (D):

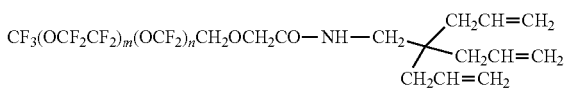

(m≈18 and n≈18)

The same operations as in Synthetic Example 3 were carried out using 3.0 g of the obtained polyether group-containing compound (D), and thus 3.1 g of a polyether group-containing compound (E) was obtained.

Polyether group-containing compound (E):

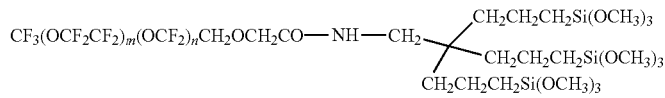

(m≈18 and n≈18)

Synthetic Example 5

The same operations as in Synthetic Example 4 were carried out except that 6.0 g of $CF_3$—$(OCF_2CF_2)_m$—$(OCF_2)_n$—$CH_2OH$ (m≈33 and n≈32) was used, and thus 5.8 g of a polyether group-containing compound (F) was obtained.

Polyether group-containing compound (F):

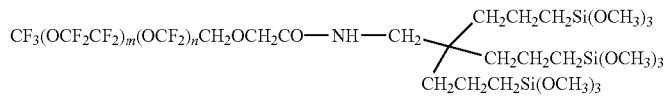

(m≈33 and n≈32)

Synthetic Example 6

The same operations as in Synthetic Example 4 were carried out except that 6.0 g of $CF_3$—$(OCF_2CF_2)_m$—$(OCF_2)_n$—$CH_2OH$ (m≈17 and n≈29) was used, and thus 6.1 g of a polyether group-containing compound (G) was obtained.

Polyether group-containing compound (G):

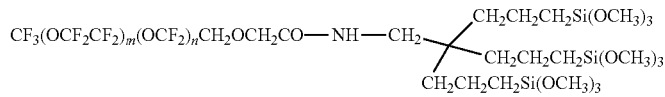

(m≈17 and n≈29)

Example 1

The polyether group-containing compound (E) obtained in the above Synthetic Example 4 was dissolved in hydrofluoroether (Novec HFE-7200, manufactured by 3M) so as to have a concentration of 0.1 mass %, and thus a surface-treating agent (1) was prepared.

Example 2

The polyether group-containing compound (F) obtained in the above Synthetic Example 5 was dissolved in hydrofluoroether (Novec HFE-7200, manufactured by 3M) so as to have a concentration of 0.1 mass %, and thus a surface-treating agent (2) was prepared.

Example 3

The polyether group-containing compound (G) obtained in the above Synthetic Example 6 was dissolved in hydrofluoroether (Novec HFE-7200, manufactured by 3M) so as to have a concentration of 0.1 mass %, and thus a surface-treating agent (3) was prepared.

Comparative Examples 1 and 2

Comparative surface-treating agents (1) and (2) were respectively prepared in the same manner as in Example 2 except that the following control compounds (1) and (2) were used in place of the polyether group-containing compound (F).

Control Compound (1)

Control Compound (2)

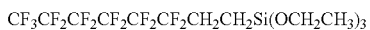

(Static Contact Angle)

The static contact angle was measured by the following method using a fully automatic contact angle meter Drop-Master 700 (manufactured by Kyowa Interface Science Co., Ltd.).

<Method for Measuring Static Contact Angle>

The static contact angle was determined by dripping 2 µL of water from a microsyringe onto a horizontally placed substrate and taking a still image with a video microscope 1 second after the dripping.

(Formation of Cured Film)

The surface-treating agents (1) to (3) and the comparative surface-treating agents (1) to (2) were used to form cured films (surface-treating layers) as follows.

A surface-treating agent or a comparative surface-treating agent was applied to a chemically tempered glass ("Gorilla" glass, manufactured by Corning Incorporated, thickness 0.7 mm) using a spin coater.

The spin coating conditions were 300 rpm for 3 seconds and 2000 rpm for 30 seconds.

The coated glass was heated at 150° C. for 30 minutes in a thermostatic oven in air to form a cured film.

[Evaluation of Cured Film Properties]

Properties of the resulting cured film were evaluated as follows.

<Static Contact Angle>

(Initial Evaluation)

First, as an initial evaluation, after the cured film was formed, the static water contact angle of the surface with which nothing was brought into contact yet was measured.

(Evaluation after Wiping with Ethanol)

The above cured film was wiped back and forth five times with Kimwipe (trade name, manufactured by Jujo Kimberly Co., Ltd.) sufficiently soaked with ethanol, and dried. After drying, the static water contact angle of the cured film was measured.

<Fingerprint Adherability and Wiping Property>

(Fingerprint Adherability)

A finger was pressed against a cured film formed using a surface-treating agent or a comparative surface-treating agent, and how easily a fingerprint adheres was visually judged. Evaluations were made according to the following criteria:

A: Fingerprint unlikely adhered, or not noticeable even when adhered.

B: Adhered fingerprint was little, but fingerprint sufficiently confirmed.

C: Fingerprint adhered as clearly as fingerprint on untreated glass substrate.

(Fingerprint Wiping Property)

After the above fingerprint adherability test, the adhered fingerprint was wiped off back and forth five times with Kimwipe (trade name, manufactured by Jujo Kimberly Co., Ltd.), and how easily the adhered fingerprint was wiped off was visually judged. Evaluations were made according to the following criteria:

A: Fingerprint completely wiped off.

B: Fingerprint wiping marks remained.

C: Fingerprint wiping marks spread, and difficult to remove.

The results of the series of evaluations are summarized in Table 1 below.

TABLE 1

| Treatment agent | | Contact angle (degree) | | Fingerprint adherability and wiping property | |
|---|---|---|---|---|---|
| | | Initial evaluation | After wiping with ethanol | Fingerprint adherability | Fingerprint wiping property |
| Surface-treating agent (1) | Example 1 | 113 | 113 | A | A |
| Surface-treating agent (2) | Example 2 | 115 | 115 | A | A |
| Surface-treating agent (3) | Example 3 | 114 | 114 | A | A |
| Comparative surface-treating agent (1) | Comparative Example 1 | 113 | 112 | A | B |
| Comparative surface-treating agent (2) | Comparative Example 2 | 105 | 103 | B | C |

The contact angles of the cured films formed using the surface-treating agents (1) to (3) were not decreased even when the films were wiped using ethanol. On the other hand, the contact angles of the cured films formed using the comparative surface-treating agents (1) and (2) were decreased when the films were wiped using ethanol. This is considered to be because the cured films formed with the comparative surface-treating agents (1) and (2) have poor chemical resistance (durability against solvents).

[Evaluation of Cured Film Friction Durability]

The friction durability of the obtained cured film was evaluated as follows.

<Friction Durability Test Against Eraser>

Using a rubbing tester (manufactured by Shinto Scientific Co., Ltd.), the water resistance contact angle was measured every 2,500 rubs under the following conditions, and the test was continued until it reached 10,000 rubs or until the angle became less than 100°. The test environment conditions were 25° C. and a humidity of 40% RH.

Eraser: Raber Eraser (manufactured by Minoan)
Contact area: 6 mmφ
Moving distance (one way): 30 mm
Moving speed: 3,600 mm/min
Load: 1 kg/6 mmφ

The results of the above evaluation are summarized in Table 2 below. In the table, "-" means that the measurement was not performed.

TABLE 2

| Treatment agent | | Eraser friction count | | | | |
|---|---|---|---|---|---|---|
| | | 0 times | 2,500 times | 5,000 times | 7,500 times | 10,000 times |
| Surface-treating agent (1) | Example 1 | 113 | 113 | 112 | 110 | 109 |
| Surface-treating agent (2) | Example 2 | 115 | 114 | 114 | 112 | 105 |
| Surface-treating agent (3) | Example 3 | 114 | 115 | 112 | 110 | 103 |
| Comparative surface-treating agent (1) | Comparative Example 1 | 113 | 89 | — | — | — |

INDUSTRIAL APPLICABILITY

The fluoropolyether group-containing compound of the present disclosure can be suitably utilized to form a surface-treating layer on the surface of a variety of substrates, in particular optical members for which friction durability is required.

What is claimed is:

1. A fluoropolyether group-containing compound of the following formula (1) or (2):

$$R^{F1}-X-R^{Si} \quad (1)$$

$$R^{Si}-X-R^{F2}-X-R^{Si} \quad (2)$$

wherein $R^{F1}$ is $Rf^1-R^F-O_q-$;

$R^{F2}$ is $-Rf^2{}_p-R^F-O_q-$;

$Rf^1$ is a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a group represented by formula:

$$-(OC_6F_{12})_a-(OC_5F_{10})_b-(OC_4F_8)_c-(OC_3R^{Fa}{}_6)_d-(OC_2F_4)_e-(OCF_2)_f-;$$

a, b, c, d, e, and f are each independently an integer of 0 to 200, the sum of a, b, c, d, e, and f is one or more, and the occurrence order of the respective repeating units enclosed in parentheses provided with a, b, c, d, e, or f is not limited in the formula;

$R^{Fa}$ is each independently at each occurrence a hydrogen atom, a fluorine atom, or a chlorine atom;

p is 0 or 1;

q is independently 0 or 1;

X is a group represented by the following formula:

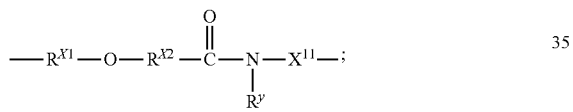

$R^{X1}$ is each independently at each occurrence a $C_{1-6}$ alkylene group;

$R^{X2}$ is each independently at each occurrence a $C_{1-6}$ alkylene group optionally substituted with a $C_{1-6}$ alkyl group or cyclic alkyl group optionally containing one or more nitrogen atoms, oxygen atoms, sulfur atoms, or silicon atoms, or with a perfluoroalkyl group;

$R^y$ is each independently at each occurrence a hydrogen atom, a $C_{1-6}$ alkyl group, or a phenyl group;

$X^{11}$ is each independently at each occurrence a single bond, an oxygen atom, or a divalent organic group;

$R^{Si}$ is each independently at each occurrence represented by the following formula (S1):

$$-CR^{d1}{}_{k2}R^{e1}{}_{l2}R^{f1}{}_{m2} \quad (S1);$$

$R^{d1}$ is each independently at each occurrence $-Z^2-CR^{31}{}_{p2}R^{32}{}_{q2}R^{33}{}_{r2}$;

$Z^2$ is each independently at each occurrence a single bond, an oxygen atom, or a divalent organic group;

$R^{31}$ is each independently at each occurrence $-Z^{2'}-CR^{32'}{}_{q2'}R^{33'}{}_{r2'}$;

$Z^{2'}$ is each independently at each occurrence a single bond, an oxygen atom, or a divalent organic group;

$R^{32'}$ is each independently at each occurrence $-Z^3-SiR^{34}{}_{n2}R^{35}{}_{3-n2}$;

$R^{33'}$ is each independently at each occurrence a hydrogen atom, a hydroxyl group, or a monovalent organic group;

q2' is each independently at each occurrence an integer of 0 to 3;

r2' is each independently at each occurrence an integer of 0 to 3;

$Z^3$ is each independently at each occurrence a single bond, an oxygen atom, or a divalent organic group;

$R^{34}$ is each independently at each occurrence a hydroxyl group or a hydrolyzable group;

$R^{35}$ is each independently at each occurrence a hydrogen atom or a monovalent organic group;

n2 is each independently at each occurrence an integer of 1 to 3;

$R^{32}$ is each independently at each occurrence $-Z^3-SiR^{34}{}_{n2}R^{35}{}_{3-n2}$;

$R^{33}$ is each independently at each occurrence a hydrogen atom, a hydroxyl group, or a monovalent organic group;

p2 is each independently at each occurrence an integer of 0 to 3;

q2 is each independently at each occurrence an integer of 0 to 3;

r2 is each independently at each occurrence an integer of 0 to 3;

$R^{e1}$ is each independently at each occurrence $-Z^3-SiR^{34}{}_{n2}R^{35}{}_{3-n2}$;

$R^{f1}$ is each independently at each occurrence a hydrogen atom, a hydroxyl group, or a monovalent organic group;

k2 is each independently at each occurrence an integer of 0 to 2;

l2 is each independently at each occurrence an integer of 1 to 3; and m2 is each independently at each occurrence an integer of 0 to 2.

2. The fluoropolyether group-containing compound according to claim 1, wherein $X^{11}$ is a divalent organic group.

3. The fluoropolyether group-containing compound according to claim 1, wherein $X^{11}$ is a $C_{1-6}$ alkylene group.

4. The fluoropolyether group-containing compound according to claim 1, wherein n2 is 2 or 3.

5. The fluoropolyether group-containing compound according to claim 1, wherein k2 is 0 and l2 is 3.

6. The fluoropolyether group-containing compound according to claim 1, wherein $R^y$ is a hydrogen atom or a $C_{1-6}$ alkyl group.

7. The fluoropolyether group-containing compound according to claim 1, wherein $R^{Fa}$ is a fluorine atom.

* * * * *